(12) United States Patent
Barber

(10) Patent No.: US 9,279,414 B2
(45) Date of Patent: Mar. 8, 2016

(54) WIND TURBINE WITH MOVABLE GENERATOR

(71) Applicant: Gerald L. Barber, Greenville, SC (US)

(72) Inventor: Gerald L. Barber, Greenville, SC (US)

(*) Notice: Subject to any disclaimer, the term of this patent is extended or adjusted under 35 U.S.C. 154(b) by 539 days.

(21) Appl. No.: 13/850,434

(22) Filed: Mar. 26, 2013

(65) Prior Publication Data

US 2014/0265344 A1 Sep. 18, 2014

Related U.S. Application Data

(63) Continuation-in-part of application No. 13/833,055, filed on Mar. 15, 2013.

(51) Int. Cl.
F03D 11/02 (2006.01)
F03D 1/06 (2006.01)

(52) U.S. Cl.
CPC .............. *F03D 11/02* (2013.01); *F03D 1/0625* (2013.01); *F03D 11/028* (2013.01); *F05B 2240/33* (2013.01); *F05B 2260/402* (2013.01); *Y02E 10/721* (2013.01); *Y02E 10/722* (2013.01)

(58) Field of Classification Search
CPC ....... F03D 11/02; F03D 11/028; F03D 1/065; F03D 1/0666; F03D 1/0625; F05B 2240/33; F05B 2260/402; Y02E 10/72; Y02E 10/7221
See application file for complete search history.

(56) References Cited

U.S. PATENT DOCUMENTS

| | | | |
|---|---|---|---|
| 1,233,232 A | 7/1917 | Heyroth | |
| 1,352,960 A | 9/1920 | Heyroth | |
| 4,319,865 A * | 3/1982 | Richard | F03D 1/0608 416/139 |
| 4,330,714 A * | 5/1982 | Smith | F03D 1/0608 290/55 |
| 4,417,853 A | 11/1983 | Cook | |
| 4,729,716 A | 3/1988 | Schmidt | |
| 6,064,123 A | 5/2000 | Gislason | |
| 7,825,532 B1 | 11/2010 | Barber | |
| 8,134,251 B2 | 3/2012 | Barber | |
| 8,174,142 B2 | 5/2012 | Barber | |
| 8,373,298 B2 | 2/2013 | Barber | |
| 2007/0166159 A1 * | 7/2007 | Williams | F03D 1/0675 416/10 |
| 2009/0096217 A1 | 4/2009 | Watson | |
| 2010/0264662 A1 | 10/2010 | Barber | |
| 2010/0264663 A1 * | 10/2010 | Barber | F03D 1/02 290/55 |
| 2010/0266407 A1 | 10/2010 | Barber | |
| 2010/0295307 A1 | 11/2010 | Barber | |
| 2011/0068729 A1 | 3/2011 | Barber | |
| 2012/0139258 A1 | 6/2012 | Barber | |

* cited by examiner

*Primary Examiner* — Ninh H Nguyen
(74) *Attorney, Agent, or Firm* — McNair Law Firm, P.A.; Douglas W. Kim

(57) ABSTRACT

An electrical generator 46 is driven by a circular rim 30 of a wind turbine 10 in response to atmospheric wind. The generator and its driving wheel 50 are supported on a tiltable platform 60 that is movable on a guide track 56 by linear actuator 66 in response to electronic sensors 76, 77. The bellows 74 biases the tiltable platform upwardly to maintain the generator driving wheel 50 in contact with the circular rim of the turbine wheel.

16 Claims, 4 Drawing Sheets

RIM SWINGS TOWARD TOWER

RIM SWINGS AWAY FROM TOWER

WIND TURBINE WITH MOVABLE GENERATOR

CROSS REFERENCE

This is a continuation-in-part of U.S. patent application Ser. No. 13/833,055, filed Mar. 18, 2013.

FIELD OF THE INVENTION

This invention concerns a wind turbine assembly for generating electricity in response to atmospheric wind. An electrical generator is driven by a circular rim of the wind turbine.

BACKGROUND OF THE INVENTION

Windmills have been used for many generations for the purpose of pumping water from the ground and for generating electricity. A basic advantage of the windmill is that it uses the power of atmospheric wind to rotate a wheel having radially extending blades. This rotary movement may be converted into various useful purposes, including the generation of electricity. For example, wind turbines include radially extending blades in the form of propellers mounted on towers that have been placed in areas about the U.S.A. where steady winds are prevalent and the wind turbines are used to generate electricity.

The blades of the conventional wind turbines usually are very large and made of expensive rigid material and are constructed to have the blades extend radially from a central hub, with no extra support beyond the axis of rotation of the central hub. These conventional wind turbine blades usually rotate at high rates of revolution and must withstand the centrifugal forces generated by the fast revolution of the blades, the cantilever bending forces applied to the blades by the wind, and the twisting forces applied to the pitched surfaces of the blades. Since the outer portions of the turbine blades may move at a very high velocity when engaged by strong winds, the longer blades require the blades to be strong, and the stronger they are the more expensive they become. Thus, there is a practical limit as to the length and width of the blades of wind turbines.

Prior art wind turbines usually are mounted on upright towers and the towers are supported at their bases by mounting the towers in the earth or on some other stable platform. When the wind turbine is in operation with an oncoming brisk wind engaging the angled blades of the turbine wheel, a significant horizontal force is applied to the turbine blades, tending to move the turbine blades in the direction of the wind horizontally toward the tower. This reduces the distance between the turbine blades and the tower.

Some of the prior art electrical wind turbines are constructed with a circular rim that is concentric with and extends about and rotates with the turbine wheel at a position away from the axis of rotation of the blades, and the turbine blades are supported by the circular rim. Rubber tires that are connected to electrical generators may be placed with their perimeters in positions to engage the circular rim of the wind turbine so that the circular rim of the wind turbine drives and rotates the rubber tires. The driven rubber tires rotate the rotors of the electrical generators. Thus, the rotation of the wind turbine is used to generate electricity. However, the circular rim of the turbine blades also moves horizontally with the turbine blades, which is axially of the turbine wheel, toward the upright tower. This tends to separate the circular rim of the turbine wheel from the rubber tires of the generator.

The prior art includes wind turbines with circular rims that drive electrical generators, such as U.S. Pat. Nos. 8,373,298 and 8,258,645. There is still a need for a more reliable and inexpensive structure and method for supporting the electrical generator and the tire that engages the circular rim of the wind turbine in a manner that causes the tire to follow the horizontal movements of the circular rim.

SUMMARY OF THE DISCLOSURE

Briefly described, this disclosure concerns a wind turbine for generating electricity that includes an upright turbine wheel support, a wind turbine wheel supported by the turbine wheel support and rotatably mounted about a horizontal axis, the wind turbine wheel including sail wings extending radially from the horizontal axis, and a circular rim extending about the sail wings of the turbine. An electrical generator assembly is mounted for driven relationship by the circular rim of the turbine wheel and for generating electricity in response to the rotation of the turbine wheel.

The electrical generator assembly includes a stationary platform mounted to the upright turbine wheel support, and the electrical generator assembly is supported by the stationary platform. The electrical generator assembly includes an electrical generator and a generator driving wheel rotatably connected to the electrical generator for rotatably engaging the circular rim of the turbine wheel and driving the electrical generator.

A movable support mounted on the stationary platform includes an alignment means that moves the generator driving wheel axially with respect to the turbine wheel into alignment with the circular rim of the turbine wheel, and an engagement means that moves the driving wheel radially with respect to the turbine wheel toward rotatable engagement with the circular rim of the turbine wheel.

The alignment means includes a movable support platform mounted on a guide track supported on the stationary platform. The guide track extends transverse to the circular rim of the turbine wheel. The alignment means includes a transporter such as a linear actuator for moving the movable support platform along the guide track for aligning the perimeter of the generator driving wheel with the circular rim of the turbine wheel.

The engagement means may include a pivotal support that is mounted on the movable support platform. The pivotal support supports the electrical generator and the generator driving wheel and is configured to lift the generator driving wheel of the electrical generator toward engagement with the circular rim of the turbine wheel. A lifting member, such as a gas inflated expandable member, is positioned on the movable platform and engages the pivotal support to lift the pivotal support and the generator driving wheel upwardly away from the movable support toward biased engagement with the circular rim of the turbine wheel.

A proximity sensor may be positioned for detecting the position and horizontal movements of the circular rim of the turbine wheel with respect to the movable support such that, in response to a change in proximity of the circular rim with respect to the proximity sensor, the proximity sensor activates the linear actuator for moving the movable support axially with respect to the circular rim of the turbine wheel to align the driving wheel of the generator with the circular rim. The proximity sensor may be movable in unison with the movable support.

The proximity sensor is configured to detect the circular rim of the wind turbine for actuating the linear actuator, for moving the generator wheel in alignment with the circular rim.

These and other objects, features and advantages of the present disclosure will become apparent upon reading the following specification, when taken in conjunction with the accompanying drawings.

DETAILED DESCRIPTION

Figure 1:
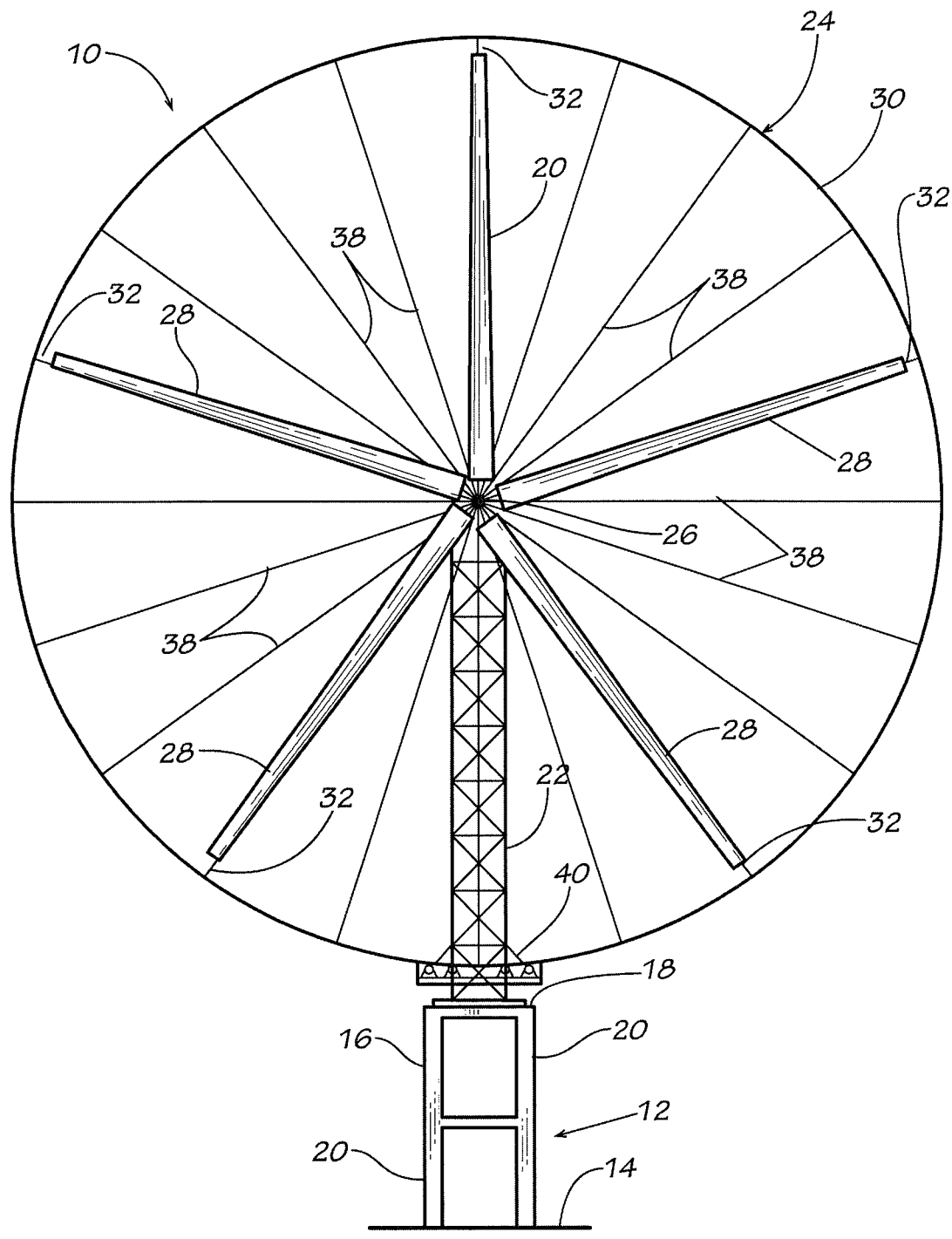
FIG. 1 is a front elevational view of the wind turbine.

Referring now in more detail to the drawings in which like numerals indicate like parts throughout the several views, FIG. 1 schematically illustrates a wind turbine 10 that is mounted on a support structure 12 at its site of installation where it will operate to generate electricity.

Generally, the support structure 12 may include a concrete base 14 that is poured on site, and a skeletal support structure 16 that includes a horizontal platform 18 mounted on upright support posts 20. A vertical mast 22 extends upwardly from the horizontal platform 18 and supports the turbine wheel 24 and its components.

Generally, the turbine wheel includes a central shaft 26 rotatable about a horizontal axis supported at the top of mast 22, a plurality of sail wings 28, and a circular rim 30 that may be positioned at the outer ends of the sail wings 28. The sail wings may be connected by universal joints 32 at their outermost ends to the perimeter rim 30, and at their inner ends (not shown in FIG. 1) to the central shaft 26. The central shaft 26 functions as the horizontal axis of the turbine wheel.

A plurality of support wires 38 extend radially from opposite ends of the central shaft 26 and are sloped inwardly for connection at their outer terminal ends to the perimeter rim 30. The support wires support the perimeter rim 30 and the perimeter rim supports the distal ends of the plurality of sail wings 28.

A more detailed disclosure of the turbine wheel is available in my co-pending U.S. patent application Ser. No. 13/833,055, filed in the U.S. Patent & Trademark Office on Mar. 18, 2013.

The disclosure in U.S. patent application Ser. No. 13/833,055 is fully incorporated herein by reference.

Figure 2:
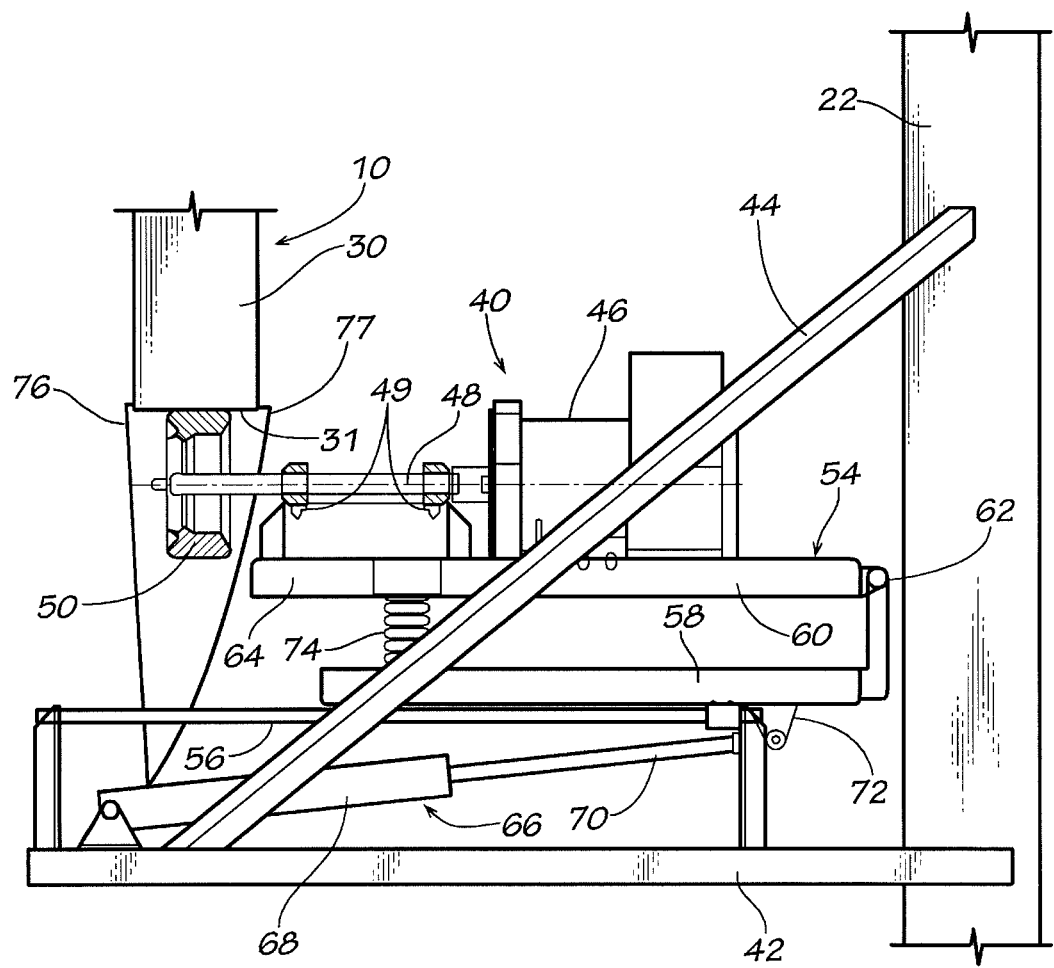
FIG. 2 is a side view of the movable generator assembly that keeps the electric generator in engagement with the circular rim of the turbine wheel.

FIG. 2 shows a close-up side view of the electrical generator assembly that is mounted to the vertical mast 22 of the wind turbine 10. The electrical generator assembly 40 includes a stationary support platform 42 attached on one side to the vertical mast 22 and extends laterally therefrom, and angled support bars 44 connected at one end to the vertical mast 22 and at the other end adjacent the distal edge of the support platform 42, thereby maintaining the support platform in a horizontal attitude.

The electrical generator assembly 40 includes the electrical generator 46 with a horizontal drive shaft 48 and a circular generator driving wheel 50 mounted on the distal end of the horizontal drive shaft 48. The horizontal drive shaft 48 is rotatably supported by appropriate bearings 49 that are, in turn, supported by a tiltable platform 60. The bearings 49 may be pillow block bearings that allow the horizontal drive shaft to rotate.

The generator driving wheel 50 is positioned to have its perimeter surface in engagement with the circular rim 30 of the wheel turbine 10.

The electrical generator assembly 40 includes a movable support 54 that supports the electrical generator 46 and generator driving wheel 50. The movable support is mounted on a pair of rods that form a rectilinear guide track 56 that extend horizontally away from the vertical mast of the wind turbine. The guide track may be in other forms, such as rails, tubes, or other means for allowing movement of the horizontal drive shaft 48 extending between the generator 46 and generator driving wheel 50.

The movable support 54 includes a movable horizontal platform 58 that runs along the guide track 56 and tiltable platform 60 that is connected by a hinge 62 to the movable platform 58, so that the proximal end is a pivotal end with respect to the movable horizontal platform and distal end 64 of the movable horizontal platform is a tiltable end and may be moved in an upward arc about the hinge 62. The tiltable platform 60 functions as a generator support.

A transporter, such as linear actuator 66, moves the platform 58 along the guide track 56. The linear actuator may be in the form of an electrical cylinder 68 and rod 70 that is reciprocatable with respect to the cylinder 68. The linear actuator may be in other forms, such as a fluid actuated cylinder and piston.

The piston rod 70 of the linear actuator is joined to connection 72 that is mounted to the bottom surface of the movable platform 58 so that reciprocation of the piston 70 out of and into the cylinder 68 causes the movable platform 58 to move horizontally along the guide track 56 toward and away from vertical mast 22 of the wind turbine. This results in movement of the generator driving wheel 50 horizontally toward and away from the vertical mast 22 so that the generator driving wheel 50 may stay in alignment with the circular rim 30 of the wind turbine 10 as the circular rim moves toward and away from the vertical mast. Therefore, the linear actuator 66, movable platform 58, and the guide track 56 together function as an alignment means that moves horizontally for aligning the generator driving wheel 50 with the circular rim 30 of the wind turbine.

A lifting member, such as a gas inflated expandable member or bellows 74, is positioned between movable platform 58 and tiltable platform 60, adjacent their distal ends, and is positioned so as to raise and lower the tiltable platform 60, causing the tiltable platform 60 to tilt about the hinge 62, resulting in raising and lowering the generator driving wheel 50. Therefore, the tiltable platform 60 and the gas inflated expandable member 74 function as an engagement means for moving the generator driving wheel into and out of contact with the circular rim 30 of the wind turbine.

Electronic sensors schematically illustrated at 76 and 77 are positioned so as to determine the horizontal-axial movements of the circular rim 30 of the wind turbine 10. When the electronic sensors detect relative movement between the generator driving wheel 50 and the circular rim 30, the electronic sensors, through a conventional circuitry, activates the linear actuator, causing the linear actuator to move the electrical generator assembly 40 in the same axial direction as the movement of the circular rim 30, keeping the generator driving wheel in alignment with the perimeter of the circular rim 30.

Figure 3:
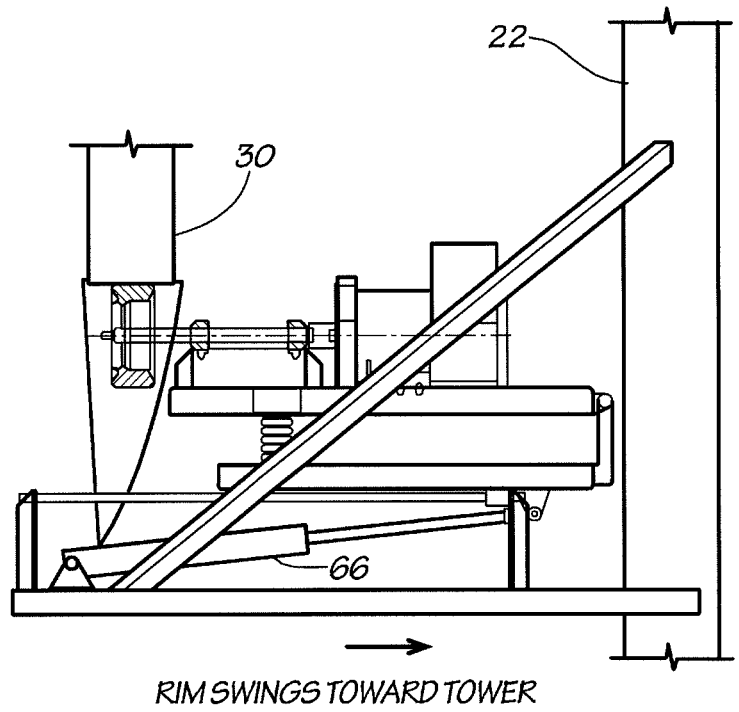
FIGS. 3 and 4 are side views of the movable generator assembly, similar to FIG. 2, but showing how the movable generator assembly moves axially with respect to the tower of the wind turbine so as to follow the horizontal movements of the turbine rim.

As shown in FIG. 3, when the circular rim 30 moves axially, horizontally toward the vertical mast 22, the linear actuator expands to push the movable platform 58, tiltable platform 60, electrical generator 46, and generator driving wheel 50 farther toward the vertical mast 22.

Figure 4:
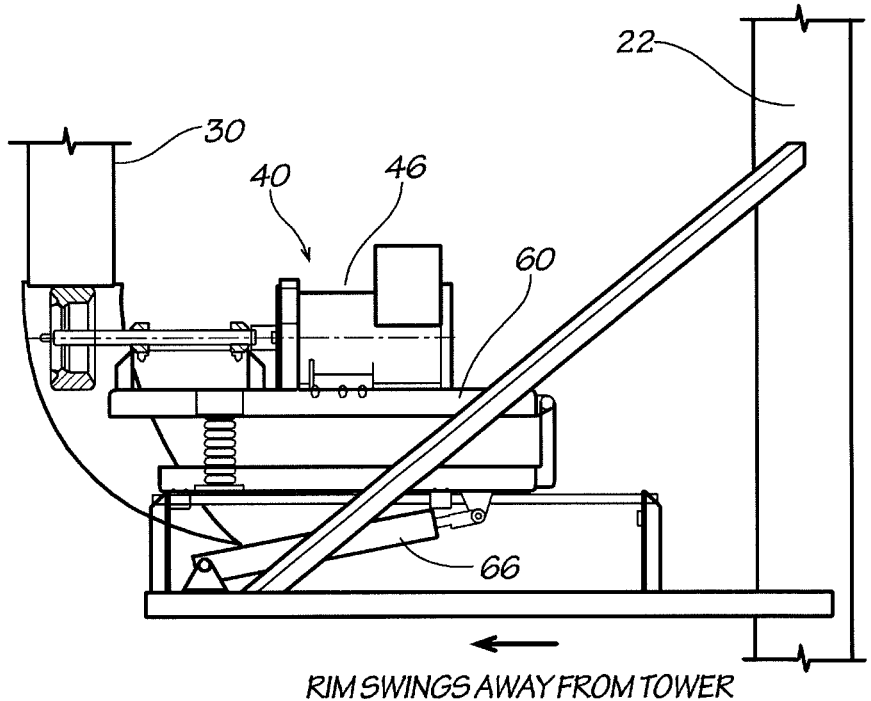
Figure 5:
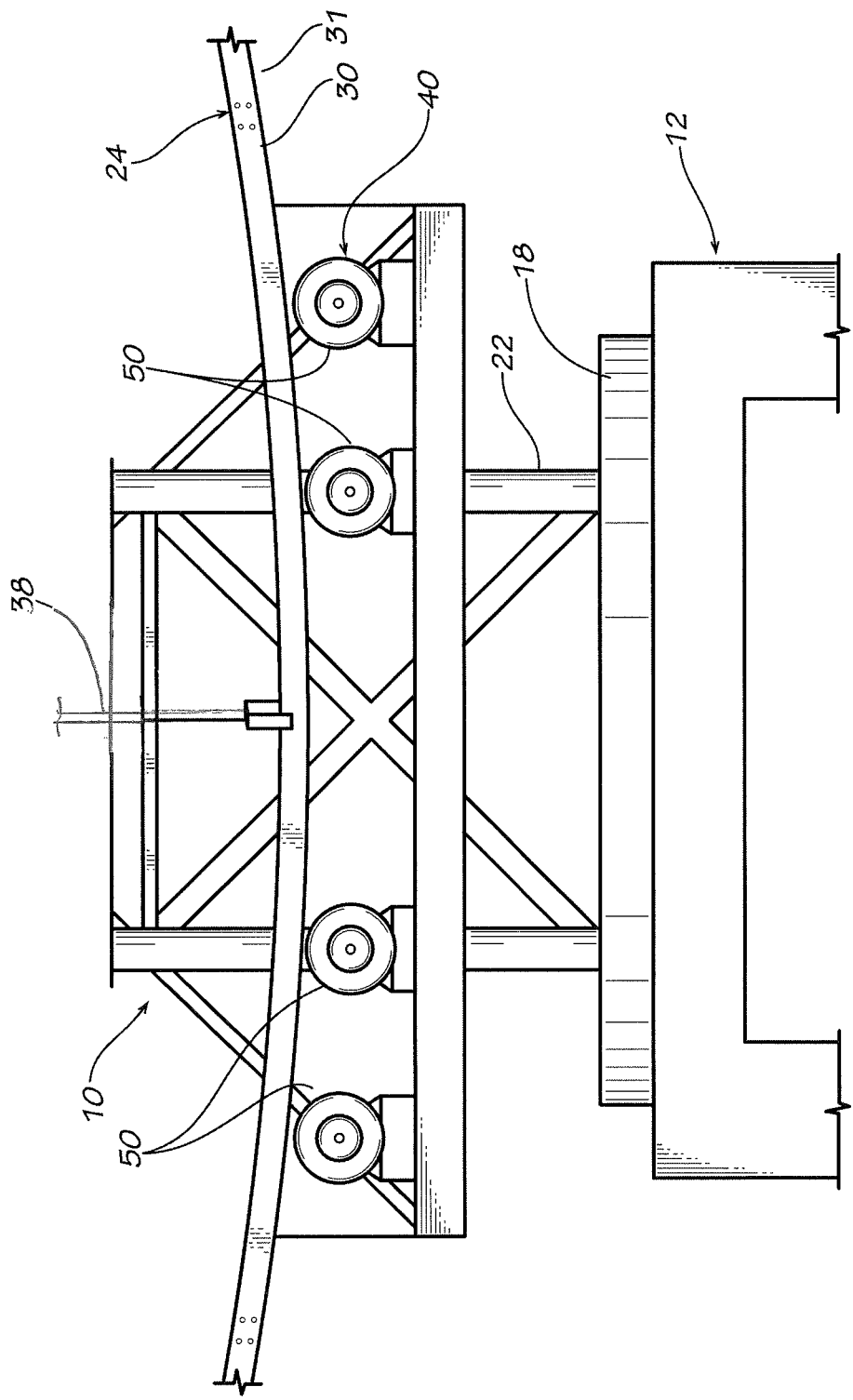
FIG. 5 is a front view concept of a plurality of movable generator assemblies, showing how multiple ones of the movable generator assemblies may be mounted for engagement with the circular rim of a wind turbine.

As shown in FIG. 4, when the reverse situation occurs, of the electrical generator assembly 40 moving farther away from the vertical mast 22, the linear actuator 66 contracts to pull the movable platform 58, tiltable platform 60, and the electrical generator assembly 40 farther away from the vertical mast 22. These movements keep the generator driving wheel 50 in alignment with the perimeter of the circular rim 30.

During the operation of the turbine wheel 10, the circular rim 30 is likely to have some imperfect movement, wobbling from side to side and undulating vertically so that the generator driving wheel may be required to move vertically in order to stay in firm contact with the circular rim 30. Accordingly, the expandable member 74 applies a constant upward force between the movable platform 58 and the tiltable platform 60, forming an engagement means that maintains constant contact between the generator driving wheel 50 and the perimeter surface 31 of the circular rim 30.

It will be understood by those skilled in the art that while the foregoing description sets forth in detail preferred embodiments of the present invention, modifications, additions, and changes might be made thereto without departing from the spirit and scope of the invention, as set forth in the following claims.

The invention claimed is:

1. A wind turbine for generating electricity comprising:
a turbine wheel support,
a turbine wheel rotatably mounted on said turbine wheel support, said turbine wheel including a laterally extending central axis of rotation, a circular rim concentric with and rotatable about said central axis of rotation, and sail wings extending radially from said central axis of rotation,
an electrical generator assembly mounted for driven relationship with said circular rim of said turbine wheel and for generating electricity in response to the rotation of said turbine wheel, said electrical generator assembly including a generator and a driving wheel rotatably connected to said generator for rotatably engaging the circular rim of the turbine wheel for generating electricity,
a movable support for supporting said driving wheel, said movable support including means for moving said driving wheel radially with respect to said turbine wheel toward rotatable engagement with the circular rim of said turbine wheel, and means for moving said driving wheel axially with respect to said turbine wheel into alignment with the circular rim of said turbine wheel.

2. The wind turbine of claim 1, wherein said movable support comprises
a guide track extending transverse to said circular rim of said turbine wheel,
a tiltable support movable along said guide track,
said driving wheel and said generator mounted on said pivotal support, and
biasing means for lifting said tiltable support and raising said driving wheel into engagement with the circular rim of said turbine wheel.

3. The wind turbine of claim 2, wherein said biasing means is selected from the group consisting of: a gas actuated bellows, a gas actuated expandable chamber, a solenoid, and a fluid actuated cylinder and piston.

4. The wind turbine of claim 2, wherein said means for moving said driving wheel axially with respect to said turbine wheel into alignment with the circular rim of said turbine wheel comprises a linear actuator.

5. The wind turbine of claim 4, wherein said linear actuator is selected from the group consisting of: a fluid actuated cylinder and piston, a solenoid, and a fluid actuated expandable chamber.

6. The wind turbine of claim 2, wherein said tiltable support includes a platform having opposed ends, a hinge member supporting one end of said platform and said driving wheel positioned at the other end of said platform, and said generator positioned intermediate said opposed ends of said platform.

7. The wind turbine of claim 2, wherein said means for moving said driving wheel axially with respect to said turbine wheel into alignment with the circular rim of said turbine wheel includes a proximity sensor movable in unison with said movable support for detecting the position of the circular rim of said turbine wheel with respect to said movable support, such that in response to a change in proximity of the circular rim with respect to said proximity sensor the proximity sensor activates said linear actuator for moving said movable support axially with respect to said circular rim of the turbine wheel to align the driving wheel with the circular rim.

8. The wind turbine of claim 7, wherein said proximity sensor is configured to detect both sides of the circular rim.

9. The wind turbine of claim 1, wherein said electrical generator is supported on said movable support.

10. An electrical generator assembly for engaging with a circular rim of a turbine wheel and for generating electricity in response to the rotation of the turbine wheel, comprising:
a guide track extending transverse to said circular rim of said turbine wheel,
a movable support movable along said guide track toward and away from said circular rim, said movable support including a pivotal end and a tiltable end opposed said pivotal end,
an electrical generator supported on said movable support adjacent the pivotal end of said movable support,
a wheel in driving relationship with respect to said electrical generator positioned adjacent said tiltable end of said movable support,
a biasing means for raising and lowering said tiltable end of said movable support about said pivotal end to move the wheel toward and away from engagement of the circular rim of said turbine wheel,
a transporter for moving said movable support along said guide track for aligning said wheel with said circular rim of said turbine wheel, and
a proximity sensor configured to detect the circular rim of said wind turbine and for actuating said transporter for moving said wheel in alignment with the circular rim.

11. The electrical generator of claim 10, wherein said proximity sensor is movable in unison with said movable support.

12. The electrical generator of claim 10, wherein said transporter is a linear actuator.

13. The electrical generator of claim 10, and further comprising a trolley mounted on said guide track, a hinge connecting said pivotal end of said movable support to said trolley, and said biasing means supported by said trolley between said trolley and said movable support.

14. The electrical generator of claim 10, wherein said proximity sensor comprises a pair of proximity sensors that are positioned to detect opposite sides of the circular rim of the turbine wheel.

15. The electrical generator of claim 10, wherein said biasing means is selected from the group consisting of: a gas actuated bellows, a fluid actuated expandable chamber, a solenoid, and a fluid actuated cylinder and piston.

16. An electrical generator assembly for engaging a circular rim of a wind turbine wheel and for generating electricity in response to the rotation of the wind turbine wheel, comprising:
- an electrical generator with a generator driving wheel for engagement with the circular rim of the wind turbine wheel,
- a movable platform supporting said electrical generator and said generator driving wheel,
- an actuator for moving said movable platform to position the generator driving wheel into alignment with the circular rim of the wind turbine wheel, and
- a biasing means for moving said movable platform and the driving wheel toward engagement of the driving wheel against the circular rim of said turbine wheel.

\* \* \* \* \*